United States Patent [19]

Carter et al.

[11] Patent Number: 5,052,111

[45] Date of Patent: Oct. 1, 1991

[54] METHOD AND APPARATUS FOR PROVIDING RUNOUT COMPENSATION IN A WHEEL

[75] Inventors: Ronald W. Carter, Murfreesboro; Robert E. Williams, Brentwood, both of Tenn.

[73] Assignee: Ammco Tools Technology Corporation, Wilmington, Del.

[21] Appl. No.: 594,081

[22] Filed: Oct. 9, 1990

[51] Int. Cl.$^5$ .......................................... C01B 19/575
[52] U.S. Cl. ................................................. 33/203.18
[58] Field of Search ................ 33/203, 203.18, 203.19, 33/203.20, 203.21, 283, 600, 288, 645

[56] References Cited

U.S. PATENT DOCUMENTS 3,892,042  7/1975  Senften .
4,138,825  2/1979  Pelta ................................. 33/203.18
4,180,915  1/1980  Lill .
4,192,074  3/1980  Chang .
4,953,296  9/1990  Spainhour .

FOREIGN PATENT DOCUMENTS 2356122  2/1978  France .............................. 33/203.18

Primary Examiner—Harry N. Haroian
Attorney, Agent, or Firm—Edmond T. Patnaude

[57] ABSTRACT

A method of measuring the runout between a gauge and the axis of rotation of a wheel to which the gauge is mounted in each of two orthogonally related planes uses measurements of the angle between the axis of rotation of the wheel and the axis on which two or more angle sensors are pendulously supported at two or more rotational positions of the wheel and measurements of the angle of rotation of the wheel at each of said rotational positions to derive a runout equation which may be subsequently used to compute the runout at every possible rotational position of the wheel.

5 Claims, 2 Drawing Sheets

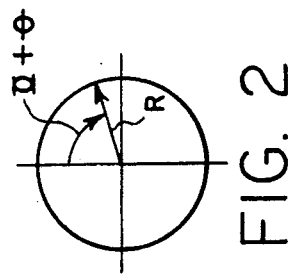
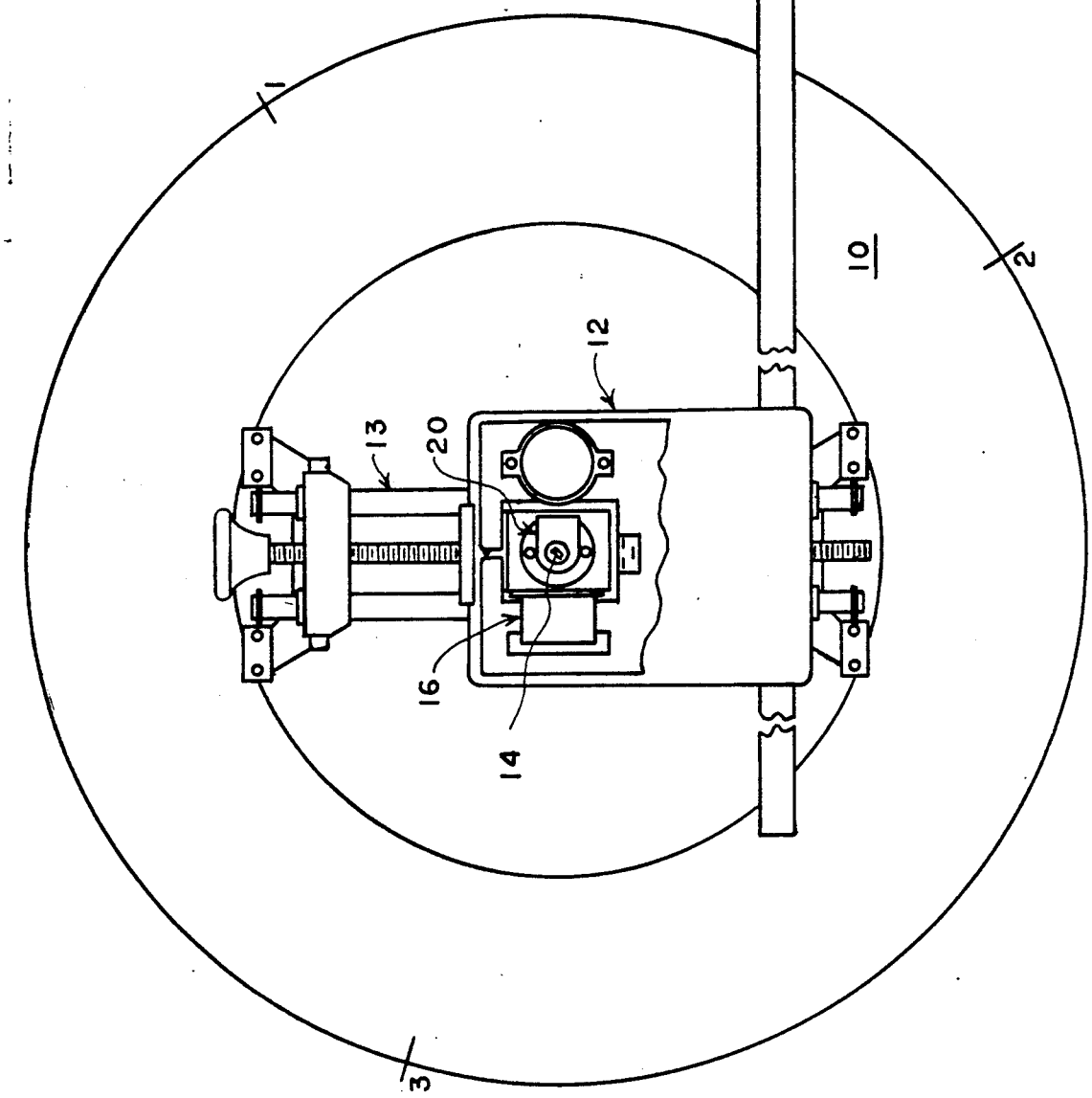

CAMBER RUNOUT

TOE RUNOUT

METHOD AND APPARATUS FOR PROVIDING RUNOUT COMPENSATION IN A WHEEL

The present invention relates in general to the art of wheel alignment, and it relates more particularly to a new and improved method for compensating wheel alignment measurements for the amount of runout between the axis of rotation of the wheel and a plurality of angle sensors mounted on the wheel to make the wheel alignment measurements.

BACKGROUND OF THE INVENTION

When aligning the wheels of a vehicle, it has been the common practice to mount one or more gauge heads to the wheels in order to measure certain angles such as camber, caster, toe and steering axis inclination. The gauge heads are pendulously supported by wheel clamps which are attached to the rims of the wheels so that the gauge head swings freely about the axis of rotation of the wheel. Any misalignment between the gauge axis and the wheel axis is known as runout and unless corrected for, results in inaccurate measurements and a subsequent misalignment of the wheels of the vehicle.

Pending application, Ser. No. 398,001, filed Aug. 24, 1989, now U.S. Pat. No. 4,953,296 and assigned to the assignee of the present application, discloses a method and apparatus for making a plurality of wheel alignment measurements using two or more angle sensors and for compensating such measurements for the runout between the angle sensors and the axis of rotation of the wheel on which the angle sensors are mounted. In the system described in that application, an encoder is mounted to the wheel for measuring and recording the angle of rotation of the wheel at a plurality of positions where runout measurements and subsequent wheel alignment parameter measurements are made by angle sensors.

U.S. Pat. Nos. 3,892,042, 4,138,825 and 4,192,074 also disclose methods and apparatus for providing runout compensation at the particular rotational position of the wheel at which the wheel alignment parameter measurements must be made. As disclosed in these patents, the technician must first rotate the wheel to a plurality of positions while the weight of the vehicle is lifted off the wheel and then make the actual wheel alignment parameter measurement at a particular position of rotation of the wheel while the weight of the vehicle is on the wheel. This requires the technician to use considerable care while making adjustments to the suspension system of the vehicle to avoid rotation of the wheel from the particular and only position where the runout can be corrected. The problem also occurs in relation to wheels on opposite sides of the vehicle which are connected by a differential, since rotation of the one wheel exerts a torque on the opposite wheel which will thus rotate from the preset position unless the technician takes the necessary action to prevent such unwanted rotation.

SUMMARY OF THE INVENTION

Briefly, there is provided in accordance with the present invention a new and improved method of compensating for the runout between a wheel alignment instrument and the axis of rotation of a wheel to which the instrument is mounted. Runout measurements are made in a single plane or in each of two orthogonally related planes at two or more rotational positions of a wheel to which two or more mutually orthogonal angle sensors and a wheel position encoder are mounted. The magnitude of the runout and wheel rotational position at each of a plurality of rotational positions of the wheel while the weight of the vehicle is lifted off the wheel is measured in a single plane or in orthogonally related planes, and such measurements are recorded and used by a computer to compensate subsequently made wheel alignment parameter measurements in the two planes at any rotational position of the wheel. Using this method of runout compensation, the wheel alignment technician does not need to position the wheel at any particular position of rotation while making the actual wheel alignment measurements, such as the camber and toe measurements. It may thus be seen that the use of this method facilitates use of a wheel alignment system and provides more consistent and accurate results than was provided in the past.

GENERAL DESCRIPTION OF THE DRAWING

Further objects and advantages and a better understanding of the present invention will be had by reference to the following detailed description taken in connection with the accompanying drawings wherein:

FIG. 1 is a side elevational view in schematic form of the right front wheel of a vehicle together with an angle measurement instrument mounted on the wheel;

FIG. 2 is an illustration of the runout circle between the wheel and the instrument of FIG. 1;

DETAILED DESCRIPTION OF A PREFERRED EMBODIMENT OF THE INVENTION

Figure 3:
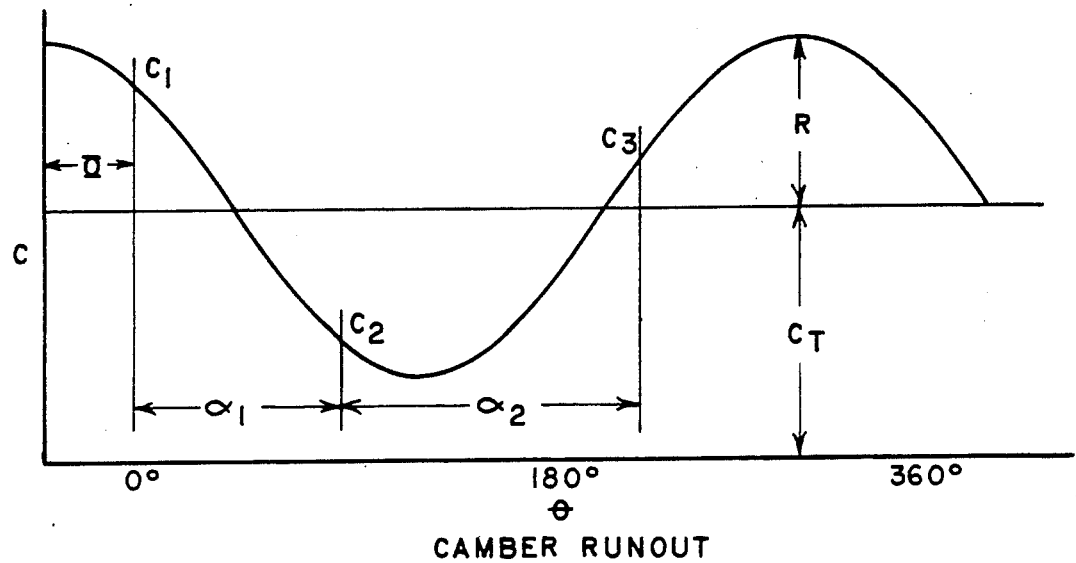
FIG. 3 is an illustration of the waveform of the runout of the wheel and the instrument shown in FIG. 1 in the camber plane.

Referring to FIG. 1, there is shown in schematic form the right front wheel 10 of an automotive vehicle to which a wheel alignment gauge head 12 is mounted by means of a suitable wheel clamp 13. The gauge head is pendulously mounted to the wheel so as to swing freely about an axis which is approximately coaxial with the axis of rotation of the wheel 10. The axis of rotation of the wheel 10 is identified in FIG. 1 by the number 14.

The gauge head 12 carries a first angle sensor 16 which develops an electric signal representative of the angular position of the gauge head relative to the vertical plane. The gauge head 12 also carries a second angle sensor 18 which develops an electric signal representative of the angular position of the gauge head relative to the horizontal plane. The gauge head 12 and the angle sensors 16 and 18 are conventional in the wheel alignment art for making camber and toe measurements, and additional angle sensors are commonly carried by the gauge head for making other angle measurements used in the alignment of the wheels of a vehicle. However, in order to understand the present invention, only the angle sensors 16 and 18 need be considered.

The gauge head 12 also carries a device 20, herein called an encoder, which develops an electric signal as the wheel 10 is rotated. This latter signal, which may consist of a train of unidirectional pulses which are respectively generated for each predetermined increment of rotation of the wheel, is used to correlate the measurements made by the angle sensors 16 and 18 with the rotational position of the wheel at the time the measurements are made both during the runout measuring operation and in the subsequent camber and toe measurements. The encoder 20 may be of the type described in said copending application Ser. No. 398,001.

It is well known that any wobble of the wheel or of the gauge head as the wheel rotates affects the measurements made by the angle sensors 16 and 18, and it is necessary, therefor, either to eliminate the wobble or to compensate for it. Since in many cases it is impractical to eliminate the wobble, in recent years the usual practice has been to modify the actual toe and camber measurements to correct for such runout.

In accordance with an important feature of the present invention, the equations for the respective runout waveforms of the gauge head in the vertical and horizontal planes are initially developed by measuring and recording the camber and/or toe angles at two or more rotational positions of the wheel while simultaneously recording the rotational positions of the wheel when such measurements are made. During these measurements, the weight of the vehicle is lifted off the wheel. These runout equations are stored in a computer for subsequent use when the actual camber and toe measurements are made by means of the angle sensors 16 and 18. As a result of the present invention, after the runout measurements have been made with the vehicle in an elevated position, the vehicle can be lowered without having to hold the wheel in any particular rotational position since any rotation of the wheel will be monitored by the encoder 20, and the computer will thus use the previously developed runout equation to calculate the runout at the new position of the wheel.

Figure 4:
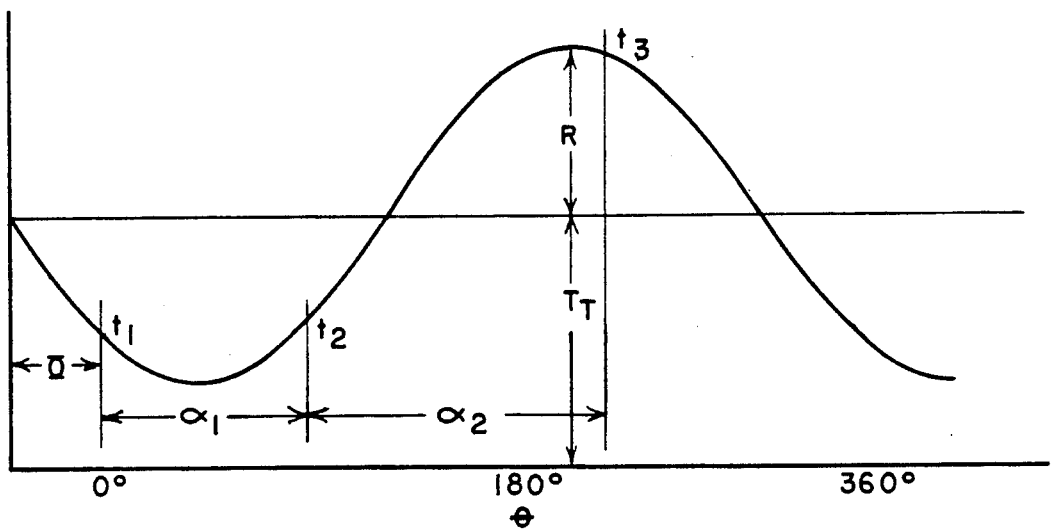
FIG. 4 is an illustration of the waveform of the runout of the wheel and the instrument shown in FIG. 1 in the toe plane.

As the wheel 10 is rotated, the axis on which the gauge head swings remains in the position shown in FIG. 1 under the force of gravity. Because of the angle between the axis of rotation of the wheel 10 and the axis about which the gauge head 12 rotates, the axis of the gauge head generates a runout circle having a radius R as shown in FIG. 2. The waveform of the runout circle relative to the vertical plane is shown in FIG. 3, and the waveform of the runout circle relative to the horizontal plane is shown in FIG. 4. In these two waveforms, the value of camber or toe is plotted on the ordinate axis and the rotational position of the wheel is plotted on the absyssa axis. It will be evident from an inspection of FIGS. 3 and 4 that the camber and toe waveforms are 90 degrees out of phase with one another.

The development of the complete runout equations for every rotational position of the wheel may be carried out in several ways as described hereinafter. Three such methods are described in detail and are referred to as Method 1, Method 2, and Method 3.

METHOD 1

Method 1 is a three-point method wherein runout measurements are made at three different rotational positions of the wheel while the weight of the vehicle is lifted off of the the wheel. This method may be used to generate the runout equations for both the camber plane and the toe plane by making the runout measurements in either the camber plane or the toe plane or by making the runout measurements simultaneously in both the camber and toe planes.

When using this method to develop the camber runout equation, with the weight of the vehicle lifted off the wheel, the wheel is rotated in a clockwise direction from an arbitrarily chosen first angular position 1 at which the angle of the gauge head relative to the vertical is measured by the angle sensor 16 and recorded by the computer to a second angular position 2 and then to a third angular position 3. At each of the second and third positions the angle of the gauge head relative to the vertical plane is also measured and recorded. At each of the angular positions 1, 2 and 3, the rotational position of the wheel is recorded.

The variables in FIG. 3 are as follows:

$\theta$ is the angle through which the wheel 10 has been rotated relative to position 1, clockwise rotation being positive.

c is the camber value as a function of wheel rotation angle.

R is the runout magnitude.

$\phi$ is the angle from position 1 to the reference point on the waveform.

$C_T$ is the true camber value.

$\alpha_1$ is the angle between position 1 and position 2.

$\alpha_2$ is the angle between position 2 and position 3.

The equation for the waveform is:

$$c = C_T + R \cdot \cos(\theta + \phi)$$

The equations for the three data points are:

$$c_1 = C_T + R \cdot \cos(\phi) \quad [Eq_1]$$

$$c_2 = C_T + R \cdot \cos[\phi + \alpha_1] \quad [Eq_2]$$

$$c_3 = C_T + R \cdot \cos[\phi + \alpha_1 + \alpha_2] \quad [Eq_3]$$

By expanding the sum of angles expressions in equations 2 and 3 and making the following substitutions, the equations may be rewritten.

Let $k_{c1} = \cos[\alpha_1]$, $k_{s1} = \sin[\alpha_1]$, $k_{c2} = \cos[\alpha_1 + \alpha_2]$ and $k_{s2} = \sin[\alpha_1 + \alpha_2]$ $$c_2 = C_T + R \cdot k_{c1} \cdot \cos(\phi) - R \cdot k_{s1} \cdot \sin(\phi) \quad [Eq_{2a}]$$

$$c_3 = C_T + R \cdot k_{c2} \cdot \cos(\phi) - R \cdot k_{s2} \cdot \sin(\phi) \quad [Eq_{3a}]$$

Solving for $\sin(\phi)$ and $\cos(\phi)$ in equations 1, 2a and 3a and letting $$k = k_{s1} \cdot [1 - k_{c2}] - k_{s2} \cdot [1 - k_{c1}]$$

$$\sin(\phi) = \frac{[c_1 - c_2] \cdot [1 - k_{c2}] - [c_1 - c_3] \cdot [1 - k_{c1}]}{R \cdot k}$$

$$\cos(\phi) = \frac{[c_1 - c_3] \cdot [k + k_{s2} \cdot [1 - k_{c1}]]}{R \cdot k \cdot [1 - k_{c2}]} -$$

$$\frac{[c_1 - c_2] \cdot [1 - k_{c2}] \cdot k_{s2}}{R \cdot k \cdot [1 - k_{c2}]}$$

Let $x = \frac{[c_1 - c_3] \cdot [k + k_{s2} \cdot [1 - k_{c1}]]}{k \cdot [1 - k_{c2}]} -$ $$\frac{[c_1 - c_2] \cdot [1 - k_{c2}] \cdot k_{s2}}{k \cdot [1 - k_{c2}]}$$

and $$y = \frac{[c_1 - c_2] \cdot [1 - k_{c2}] - [c_1 - c_3] \cdot [1 - k_{c1}]}{k}$$

Now $\sin(\phi)$ and $\cos(\phi)$ may be expressed as:

$$\sin(\phi) = \frac{y}{R} \text{ and} \qquad [Eq_4]$$

$$\cos(\phi) = \frac{x}{R} \qquad [Eq_5]$$

From basic trigonometric definitions the following may be written:

$$R = \sqrt{x^2 + y^2} \text{ and} \qquad [Eq_6]$$

$$\phi = \arctan\left[\frac{y}{x}\right] \qquad [Eq_7]$$

The equation for runout correction as a function of wheel angle now becomes:

$$rc_\theta = R \cdot \cos(\theta + \phi) \qquad [Eq_8]$$

Thus with R and $\phi$ being known, the runout correction is completely specified for any wheel angle $\theta$.

The runout equation for toe (FIG. 4) could be obtained from equation 8 by shifting the cos function in equation 8 by ninety degrees so that $rt_\theta = R \cdot \cos(\theta + \phi + 90°) = -R \cdot \sin(\theta + \phi)$. Conversely data may be taken for the toe plane and a development analgous to that for camber may be performed by substituting t for c, T for C and the negative sin function for the cos function in which case the equation for toe is:

$$t = T_T - R \sin(\theta + \phi).$$

The end result would be $rt_\theta = -R \cdot \sin(\theta + \phi)$ as given above. The runout equation for camber could then be obtained from this equation by shifting $-90°$, i.e., $rc_\theta = -R \sin(\theta + \phi - 90°) = R \cos(\theta + \phi)$ as in equation 8.

METHOD 2

Method 2 is a two-point method wherein runout measurements are made at two different rotational positions of the wheel while the weight of the vehicle is lifted off the wheel. This method may be used to generate the runout equations for both the camber and toe planes.

When using this method to develop the runout equations for the camber and toe planes, the weight of the vehicle is lifted off the wheel, and the camber, toe, and rotational position are measured and recorded by the computer while the wheel is at an arbitrary rotational position. The wheel is then rotated to another arbitrary rotational position different from the first position, and the camber, toe and rotational position of the wheel are again measured and recorded by the computer. The equation for the camber waveform is:

$$c = C_T + R \cdot \cos(\theta + \phi)$$

The equation for the toe waveform is:

$$t = T_T - R \cdot \sin(\theta + \phi)$$

The equations for the measurements at point 1 are:

$$c_1 = C_T + R \cdot \cos(\phi) \qquad [Eq_9]$$

$$t_1 = T_T - R \cdot \sin(\phi) \qquad [Eq_{10}]$$

The equations for the measurements at point 2 are:

$$c_2 = C_T + R \cdot \cos(\phi + \alpha) \qquad [Eq_{11}]$$

$$t_2 = T_T - R \cdot \sin(\phi + \alpha) \qquad [Eq_{12}]$$

Subtract equation 11 from 9 and 12 from 10.

$$c_1 - c_2 = R \cdot \cos(\phi) - R \cdot \cos(\phi + \alpha) \qquad [Eq_{13}]$$

$$t_1 - t_2 = -R \cdot \sin(\phi + \alpha) \qquad [Eq_{14}]$$

By expanding the sum of angles expressions in equations 13 and 14 and making the following substitutions, the equations may be rewritten.

Let $k_1 = 1 - \cos(\alpha)$ and $k_2 = \sin(\alpha)$ $$c_1 - c_2 = R \cdot k_1 \cdot \cos(\phi) + R \cdot k_2 \cdot \sin(\phi) \qquad [Eq_{13a}]$$

$$t_1 - t_2 = R \cdot k_2 \cdot \cos(\phi) - R \cdot k_1 \cdot \sin(\phi) \qquad [Eq_{14a}]$$

Solve for $\sin(\phi)$ and $\cos(\phi)$ in equations 13a and 14a.

$$\sin(\phi) = \frac{k_2 \cdot [c_1 - c_2] - k_1 \cdot [t_1 - t_2]}{R \cdot [k_1^2 + k_2^2]}$$

$$\cos(\phi) = \frac{k_1 \cdot [c_1 - c_2] + k_2 \cdot [t_1 - t_2]}{R \cdot [k_1^2 + k_2^2]}$$

Let $x = \frac{k_1 \cdot [c_1 - c_2] + k_2 \cdot [t_1 - t_2]}{k_1^2 + k_2^2}$ and $$y = \frac{k_2 \cdot [c_1 - c_2] - k_1 \cdot [t_1 - t_2]}{k_1^2 + k_2^2}$$

Now $\sin(\phi)$ and $\cos(\phi)$ may be expressed as:

$$\sin(\phi) = \frac{y}{R} \text{ and} \qquad [Eq_{15}]$$

$$\cos(\phi) = \frac{x}{R} \qquad [Eq_{16}]$$

From basic trigonometric definitions the following may be written:

$$R = \sqrt{x^2 + y^2} \text{ and} \qquad [Eq_{17}]$$

$$\phi = \arctan\left[\frac{y}{x}\right] \qquad [Eq_{18}]$$

The equations for runout correction as a function of wheel angle now become:

$$rc_\theta = R \cdot \cos(\theta + \phi) \qquad [Eq_{19}]$$

$$rt_\theta = -R \cdot \sin(\theta + \phi) \qquad [Eq_{20}]$$

Thus with R and $\phi$ being known, the runout correction is completely specified for any wheel angle $\theta$. Using these six measurements, the computer develops the complete runout equations for both the camber and toe planes.

METHOD 3

This method is similar to Method 1 and is also a method of generating the runout equations for both the horizontal and vertical planes. When using this method, the wheel is continuously rotated through an angle sufficient to produce at least one maximum and at lease one minimum reading of the runout waveform. The minimum rotational angle required is between 180 and 360 degrees depending on the starting position of the wheel. The camber measurement is made each time the encoder reading indicates that the wheel has rotated through a predetermined incremental angle. From these measurements the maximum and minimum camber values and the rotational position at which the maximum occurred may be determined. This information enables the generation of the runout equation for the camber plane. It is possible to generate the runout equation for the toe plane using this same data, or runout readings in the toe plane can also be made as the wheel is rotated. The toe readings can be made simultaneously with those in the camber plane.

The following development shows how to determine the runout compensation equation using this method.

Let the maximum value measured by $c_{max}$ and the minimum value $C_{min}$ then:

$$c_{max} = C_T + R \qquad [\text{Eq 21}]$$

$$c_{min} = C_T - R \qquad [\text{Eq 22}]$$

Solving for R:

$$R = \frac{c_{max} - c_{min}}{2} \qquad [\text{Eq 23}]$$

Since the encoder reading for the angle at which the maximum occurred is known, the expression for runout compensation may be written as follows:

$$rc_\delta = R \cdot \cos(\delta) \qquad [\text{Eq 24}]$$

Where $\delta$ is the angle through which the wheel has been rotated relative to the position at which the maximum occurred.

In relation to FIG. 3 and FIG. 4 $\delta = \theta + \phi$. As in Method 1, measurements in a plane may be used to only compensate for runout in that plane or they may also be used to develop runout compensation for the other plane.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed is:

1. A method of measuring the respective angles between the plane of a rotatable wheel and first and second orthogonally related planes and compensating such measurements for runout, comprising the steps of positioning said wheel at a first angular position and measuring and recording the angle of the plane of said wheel relative to said first of said orthogonally related planes and measuring and recording the angle of rotation of said wheel at said first angular position of rotation of said wheel, positioning said wheel at a second angular position and measuring and recording the angle of the plane of said wheel relative to said first of said orthogonally related planes at said second angular position of said wheel and measuring and recording the angle of rotation of said wheel at said second angular position of rotation of said wheel, positioning said wheel at a third angular position and measuring and recording the angle of the plane of said wheel relative to said first of said orthogonally related planes at said third angular position of said wheel and measuring and recording the angle of rotation of said wheel at said third angular position of rotation of said wheel, positioning said wheel at another angular position and measuring the angles of said plane of said wheel relative to said first and second orthogonally related planes at said another angular position of said wheel, and using said recorded measurements made at said first, second and third angular positions of said wheel to compute the runout of said wheel relative to said first and said second orthogonally related planes at said another angular position of said wheel to compensate said measurements of the angles of said plane of said wheel relative to said first and second orthogonally related planes for the runout of said wheel at said another angle of rotation of said wheel.

2. A method of measuring the respective angles between the plane of a rotatable wheel and first and second orthogonally related planes and compensating such measurements for runout, comprising the steps of positioning said wheel at a first angular position and measuring and recording the angles of the plane of said wheel relative to said first and second orthogonally related planes and measuring and recording the angle of rotation of said wheel at said first angular position of rotation of said wheel, positioning said wheel at a second angular position and measuring and recording the angles of said plane of said wheel relative to said first and second orthogonally related planes at said second angular position of said wheel and measuring and recording the angle of rotation of said wheel at said second angular position of rotation of said wheel, positioning said wheel at a third angular position and measuring and recording the angles of said plane of said wheel relative to said orthogonally related planes at said third angular position of said wheel and measuring and recording the angle of rotation of said wheel at said third angular position of rotation of said wheel, positioning said wheel at another angular position and measuring the angles of said plane of said wheel relative to said first and second orthogonally related planes at said another angular position of said wheel, using said recorded measurements made at said first, second and third angular positions of said wheel of the angle between the plane of said wheel and said first one of said orthogonally related planes to compute the runout of said wheel relative to said first one of said orthogonally related planes at said another angular position of said wheel to compensate said measurement of the angle of said plane of said wheel relative to said first of said orthogonally related planes for the runout of said wheel at said another angle of rotation of said wheel, and using said recorded measurements made at said first, second and third angular positions of said wheel of the angle between the plane of said wheel and said second one of said orthogonally related planes to compute the runout of said wheel relative to said second one of said orthogonally related planes at said another angular position of said wheel to compensate said measurement of the angle of said plane of said wheel relative to said second of said orthogonally related planes for the runout of said wheel at said another angle of rotation of said wheel.

3. A method of measuring the respective angles between the plane of a rotatable wheel and first and second orthogonally related planes, and compensating such measurements for runout, comprising the steps of positioning said wheel at a first angular position of rotation, measuring and recording the angle between the plane of said wheel and said first of said orthogonally related planes at said first angular position of rotation of said wheel, measuring and recording the angle between the plane of said wheel and said second of said orthogonally related planes at said first angular position of rotation of said wheel, measuring and recording the angle of rotation of said wheel at said first angular position of rotation of said wheel, positioning said wheel at a second angular position of rotation, measuring and recording the angle between the plane of said wheel and said first of said orthogonally related planes at said second angular position of rotation of said wheel, measuring and recording the angle between the plane of said wheel and said second of said orthogonally related planes at said second angular position of rotation of said wheel, measuring and recording the angle of rotation of said wheel at said second angular position of rotation of said wheel, positioning said wheel at another angular position of rotation, measuring the respective angles between said plane of said wheel and said first and second orthogonally related planes at said another angular position of rotation of said wheel, and using said recorded measurements made at said first and second angular positions of rotation of said wheel to compute the runout of said wheel relative to said first and said second orthogonally related planes at said another angular position of rotation of said wheel to compensate said measurements of the angles between said plane of said wheel and said first and second orthogonally related planes for the runout of said wheel at said another angular position of rotation of said wheel.

4. A method of measuring the respective angles between the plane of a rotatable wheel and first and second orthogonally related planes and compensating such measurements for runout, comprising the steps of measuring and recording the maximum and minimum angles of the plane of said wheel relative to said first of said orthogonally related planes and measuring and recording the corresponding angular position of said wheel as said wheel is rotated through an angle sufficient to product at least one maximum and at least one minimum reading at the angle of the plane of said wheel relative to said first of said orthogonally related planes, positioning said wheel at another angular position and measuring the angles of said plane of said wheel relative to said first and second orthogonally related planes at said another angular position of said wheel, and using said recorded measurements of angular position of said wheel and the angle between the plane of said wheel and said first one of said orthogonally related planes to compute the runout of said wheel relative to said first and said second orthogonally related planes at said another angular position of said wheel to compensate said measurements of the angles of said plane of said wheel relative to said first and second orthogonally related planes for the runout of said wheel at said another angle of rotation of said wheel.

5. A method of measuring the respective angles between the plane of a rotatable wheel and first and second orthogonally related planes and compensating such measurements for runout, comprising the steps of measuring and recording the maximum and minimum angles of the plane of said wheel relative to said first and second orthogonally related planes and measuring and recording the corresponding angular position of said wheel as said wheel is rotated through an angle sufficient to produce at least one maximum and at least one minimum reading of the angle of the plane of said wheel relative to each of said first and second orthogonally related planes, positioning said wheel at another angular position and measuring the angles of said plane of said wheel relative to said first and second orthogonally related planes at said another angular position of said wheel, using said recorded measurements of angular position of said wheel and the angle between the plane of said wheel and said first one of said orthogonally related planes to compute the runout of said wheel relative to said first one of said orthogonally related planes at said another angular position of said wheel to compensate said measurement of the angle of said plane of said wheel relative to said first of said orthogonally related planes for the runout of said wheel at said another angle of rotation of said wheel, and using said recorded measurements of the angular position of said wheel and the angle between the plane of said wheel and said second one of said orthogonally related planes to compute the runout of said wheel relative to said second one of said orthogonally related planes at said another angular position of said wheel to compensate said measurement of the angle of said plane of said wheel relative to said second of said orthogonally related planes for the runout of said wheel at said another angle of rotation of said wheel.

* * * * *